United States Patent
Riffelmann et al.

(10) Patent No.: US 7,607,428 B2
(45) Date of Patent: Oct. 27, 2009

(54) SOLAR ABSORBER (75) Inventors: Klaus-Juergen Riffelmann, Cologne (DE); Thomas Kuckelkorn, Weiden (DE); Christina Hildebrandt, Loerrach (DE)

(73) Assignee: Schott AG, Mainz (DE)

( * ) Notice: Subject to any disclaimer, the term of this patent is extended or adjusted under 35 U.S.C. 154(b) by 77 days.

(21) Appl. No.: 11/573,117

(22) PCT Filed: Aug. 5, 2005

(86) PCT No.: PCT/EP2005/008522

§ 371 (c)(1),
(2), (4) Date: Feb. 2, 2007

(87) PCT Pub. No.: WO2006/015815

PCT Pub. Date: Feb. 16, 2006

(65) Prior Publication Data

US 2007/0209658 A1 Sep. 13, 2007

(30) Foreign Application Priority Data

Aug. 5, 2004 (DE) .................. 10 2004 038 233

(51) Int. Cl.
*F24J 2/08* (2006.01)
(52) U.S. Cl. .................. 126/684; 126/670; 126/672; 126/676; 126/694; 126/907
(58) Field of Classification Search .................. 126/684, 126/678, 694, 670, 672, 676; 427/466, 210
See application file for complete search history.

(56) References Cited

U.S. PATENT DOCUMENTS

| 257,560 | A | * | 5/1882 | Deitzler ..................... 126/694 |
| 1,661,473 | A | * | 3/1928 | Goddard et al. ............. 126/685 |
| 1,814,897 | A | * | 7/1931 | Coxe .......................... 126/646 |
| 3,036,931 | A | * | 5/1962 | Kell ........................... 427/425 |
| 3,846,152 | A | * | 11/1974 | Franz ......................... 428/333 |
| 3,968,786 | A | * | 7/1976 | Spielberg .................... 126/676 |
| 3,978,272 | A | * | 8/1976 | Donley ....................... 428/434 |
| 3,981,293 | A | * | 9/1976 | Gillery ....................... 126/648 |
| 3,987,780 | A | | 10/1976 | Nozik et al. |
| 4,022,184 | A | * | 5/1977 | Anderson ................... 126/573 |

(Continued)

FOREIGN PATENT DOCUMENTS

DE 195 15 647 10/1996

(Continued)

*Primary Examiner*—Kenneth B Rinehart
*Assistant Examiner*—Jorge Pereiro
(74) *Attorney, Agent, or Firm*—Michael J. Striker (57) ABSTRACT The solar absorber is equipped with an absorber body (10) that absorbs incident solar energy (12) and converts it to heat. The absorber body has a selective absorption layer (17) on a side (36) oriented toward the concentrator (13) and another selective absorption layer (18) on an opposite side (38) oriented away from the concentrator (13). The selective absorption layers (17, 18) have threshold wavelengths below which solar radiation is absorbed and above which a reradiation capacity of the absorber body is suppressed. The threshold wavelength of the selective absorption layer (17) on the side (36) of the absorber body that is oriented toward the concentrator is greater than the other threshold wavelength of the other selective absorption layer(18) on the opposite side (38) of the absorber body oriented away from the concentrator.

13 Claims, 5 Drawing Sheets

U.S. PATENT DOCUMENTS

| | | | | |
|---|---|---|---|---|
| 4,043,318 A * | 8/1977 | Pei | ............................. | 126/643 |
| 4,051,835 A * | 10/1977 | Hinson-Rider | .............. | 126/674 |
| 4,076,025 A * | 2/1978 | Parker | ........................ | 126/600 |
| 4,098,956 A * | 7/1978 | Blickensderfer et al. | .... | 428/627 |
| 4,165,956 A * | 8/1979 | Hendy | .......................... | 425/71 |
| 4,180,954 A * | 1/1980 | Gell, Jr. | ..................... | 52/171.3 |
| 4,206,747 A * | 6/1980 | Niedermeyer | ............... | 126/674 |
| 4,254,760 A * | 3/1981 | Sirimarco | .................... | 126/675 |
| 4,261,336 A * | 4/1981 | Uroshevich | ................... | 126/651 |
| 4,279,242 A * | 7/1981 | Bogatzki | ..................... | 126/655 |
| 4,300,538 A | 11/1981 | Uroshevich | | |
| 4,309,984 A * | 1/1982 | Dorbeck | ....................... | 126/599 |
| 4,328,389 A * | 5/1982 | Stern et al. | .................. | 136/246 |
| 4,340,035 A * | 7/1982 | Begun | ......................... | 126/676 |
| 4,344,416 A * | 8/1982 | Kemper | ....................... | 126/675 |
| 4,356,815 A * | 11/1982 | Spanoudis | .................... | 126/652 |
| 4,426,465 A * | 1/1984 | Maki et al. | ................... | 523/135 |
| 4,442,166 A * | 4/1984 | Fan | ............................. | 428/323 |
| 4,553,531 A | 11/1985 | Rosende | | |
| 4,554,908 A * | 11/1985 | Hanlet et al. | ................ | 126/652 |
| 4,582,764 A * | 4/1986 | Allerd et al. | ................ | 428/623 |
| 4,628,905 A * | 12/1986 | Mills | ........................... | 126/652 |
| 4,637,374 A * | 1/1987 | Arai | ............................ | 126/652 |
| 4,776,895 A * | 10/1988 | Goldstein | .................... | 136/253 |
| 4,777,936 A * | 10/1988 | Arai | ............................ | 126/652 |
| 4,889,601 A * | 12/1989 | Arai | ............................ | 205/227 |
| 5,080,724 A * | 1/1992 | Chubb | .......................... | 136/253 |
| 5,101,415 A * | 3/1992 | Kolb et al. | .................... | 372/99 |
| 5,460,163 A * | 10/1995 | Goebel | ........................ | 126/635 |
| 5,465,708 A * | 11/1995 | Goebel et al. | ................ | 126/635 |
| 5,523,132 A * | 6/1996 | Zhang et al. | ................ | 428/34.4 |
| 6,057,504 A * | 5/2000 | Izumi | .......................... | 136/246 |
| 6,067,931 A * | 5/2000 | Ghezzo et al. | .............. | 118/725 |
| 6,177,628 B1 * | 1/2001 | Fraas et al. | ................... | 136/253 |
| 6,271,461 B1 * | 8/2001 | Fraas et al. | ................... | 136/253 |
| 6,387,498 B1 * | 5/2002 | Coulter et al. | .............. | 428/403 |
| 6,632,542 B1 * | 10/2003 | Mahoney et al. | ............. | 428/632 |
| 6,819,465 B2 * | 11/2004 | Clikeman et al. | ........... | 359/247 |
| 2002/0180909 A1 * | 12/2002 | Lubart et al. | ................. | 349/113 |
| 2003/0117682 A1 * | 6/2003 | Clikeman et al. | ........... | 359/247 |
| 2004/0055593 A1 | 3/2004 | Besier | | |
| 2004/0126594 A1 * | 7/2004 | Rubbia et al. | ................ | 428/446 |
| 2004/0163640 A1 * | 8/2004 | Kuckelkorn | ................. | 126/694 |

FOREIGN PATENT DOCUMENTS

| | | |
|---|---|---|
| EP | 0 043 799 | 1/1982 |
| WO | 97/26488 | 7/1997 |

* cited by examiner

SOLAR ABSORBER

CROSS-REFERENCE

This is the U.S. National Stage of PCT/EP 2005/008522, filed on Aug. 5, 2005, in Europe. The invention described and claimed herein below is also described in German Patent Application 10 2004 038 233.6, which was filed on Aug. 5, 2004. The aforesaid German Patent Application provides the basis for a claim of priority of invention for the invention claimed herein below under 35 U.S.C. 119 (a) to (d).

BACKGROUND OF THE INVENTION

1. The Field of the Invention

The invention relates to a solar absorber with an absorber body that has one side oriented toward a concentrator and one side oriented away from concentrator and is equipped with a selective absorption layer, which, below a threshold wavelength, absorbs the spectrum of solar radiation and above the threshold wavelength, suppresses the reradiating capacity of the absorber body. The invention also relates to a solar absorber having an absorber tube and a casing and a side oriented toward a concentrator and a side oriented away from the concentrator.

2. The Related Art

The solar absorber is the part of a solar collector in which the solar radiation is converted into heat. In addition to optical losses, thermal losses also occur in the absorber since it assumes a higher temperature than the environment due to the conversion of the solar radiation into heat. In concentrating collectors such as parabolic trough collectors, Fresnel collectors, and solar power towers, the absorber is typically heated to several hundred degrees Celsius. The reradiation losses, which are proportional to the temperature raised to the fourth power according to the Planck's radiation formula, predominate over convective losses in vacuum-insulated absorbers.

The technical problem lies in the contradictory desire that on the one hand, the absorber should absorb the solar radiation well and on the other hand, should have a low emission of the characteristic radiation. According to Kirchhoff's law, the spectral obstruction and reradiating capacity of a body are equal. This problem can be solved by means of an optically selective coating that has a threshold wavelength below which the absorption capacity is high and above which the emitted characteristic radiation is low. Such an absorption layer makes use of the fact that the radiation to be absorbed and the emitted characteristic radiation of the absorber to be suppressed have different wavelength ranges.

In WO 97/26488, absorber bodies are described that have an optically selective coating. These coatings are characterized in that on the one hand, they have a good absorption capacity for the shortwave radiation (maximum at 0.5 μm) radiated by the sun and on the other hand, the absorber has a low reradiation of the longwave radiation (maximum at 3.5 to 5 μm) to the environment. The selective absorption layers have a low spectral reflectivity and high absorbitivity in the shortwave solar spectral range, while in the longwave spectral range, they have the highest possible spectral reflectivity, which is synonymous with a low emissivity.

The ideal threshold wavelength at which the transition from low to high reflectivity occurs primarily depends on the operating temperature of the absorption layer. For this reason, different selective layers have been developed for flat-plate collectors, vacuum tube collectors, and parabolic trough collectors.

Up to now, only the temperature of the absorber has been taken into account in designing the optimal threshold wavelength of the ideal optically selective absorption layer. Depending on the temperature, the threshold wavelength is adapted to a standard solar spectrum. The ideal threshold wavelength, however, also depends on the concentration of the solar radiation. In concentrating solar collectors, the concentration factor is frequently not distributed homogeneously over the absorber surface. Thus in a parabolic trough collector, only approximately half of the absorber tube is struck by concentrated solar radiation while the other half is illuminated by unconcentrated solar radiation. On the side oriented toward the concentrator, the radiation is typically concentrated by factors of 10 to 100 times. In an absorption layer that is homogeneously selective over the circumference of the absorber body, the thermal losses due to reradiation are therefore not minimized.

SUMMARY OF THE INVENTION

The object of the invention is to minimize reradiation losses in as much of a concentrating solar absorber as possible, namely both on the side oriented toward the concentrator and on the side oriented away from concentrator, in order to achieve an increase in the yield of captured heat.

This object is attained with the solar absorbers recited in the claims appended herein below. These embodiments provide an absorption layer on the absorber body, a coating on the casing, and at least one element between the absorber tube and the casing, which will be described in detail below. The appended claims also include an independent claim for a combination of the separately claimed embodiments.

According to the first variant, the absorption layer of the absorber body on the side oriented toward the concentrator has a threshold wavelength that is greater than the threshold wavelength on the side oriented away from concentrator.

The invention is based on the knowledge that the two opposing sides of the absorber body are exposed to different radiation densities and therefore have different absorption behaviors and emission behaviors. On the side oriented toward the concentrator, the threshold wavelength is, for example, 2350 nm. Due to the different threshold wavelengths on the two sides, each threshold wavelength is adapted to the respective spectral density so that the yield of incident radiation is optimized as a function of the spectral density. This makes it possible to achieve a high yield (gain) in radiation.

The term "concentrator" is understood to include any type of concentrating optics. In particular, these include Fresnel lenses, mirrors, lens systems, or collecting optics.

In the simplest case, the coating is divided into two regions with different absorption layers. The division can be refined by providing more than two regions, which have incrementally varying threshold wavelengths. In this case, each of the regions is adapted to the local radiation intensity.

The present invention can in particular be used in parabolic trough collectors that have an elongated absorber tube through which a heat transfer medium, e.g. oil, flows and an elongated parabolic mirror concentrates the solar radiation onto the absorber tube. The present invention can also be used in other types of solar absorbers that receive concentrated solar radiation. It is suitable for all cases in which the radiation intensity is different in different surface regions of the absorber body.

The absorber body is preferably a tube, in particular a steel tube or a porous ceramic body.

The thickness of the absorption layer is preferably less than 10 µm, in particular less than 200 nm.

The absorber layer is preferably divided into two regions with different threshold wavelengths. In this case, the one region extends over the entire side oriented away from concentrator and the second region extends over the entire side of the absorber body oriented toward the concentrator.

When the absorber body is embodied in the form of a tube, a "region" is understood to be a surface that extends on the one hand over the entire length of the tube and on the other hand over a circular arc. Several regions lie next to one another in the circumference direction of the tube.

The absorber layer can be divided into regions with continuously varying threshold wavelengths. In this case, the transition from one region to an adjacent region can be embodied as continuous. It is also possible for the threshold wavelength to continuously change within the regions.

The setting of different threshold wavelengths in the individual regions can be achieved by means of a different thickness of the absorber layer or individual, partial layers of the overall layer system. In this case, it is preferable to provide layer thickness changes of 5% to 20% and preferably 10% to 20%. The layer thickness decrease can be executed so that it extends over the entire tube circumference, which from a technical production standpoint, can be achieved by varying the rotation speed of the tube during the coating process, for example.

Preferably, the absorber layer applied to the side oriented away from the concentrator is 5 to 20% thinner than the one applied to the side oriented toward the concentrator. As a result of this, the threshold wavelength at which the absorber layer transitions from absorption to reflection is shifted toward shorter wavelengths. This reduces the emissivity at high temperatures. At the same time, the solar absorption is also reduced because a larger portion of the solar spectrum is reflected.

The absorber layer can be composed of a three-layer system comprised of a metallic mirror layer, a cermet layer, and a dielectric antireflection layer. The thickness variation for changing the threshold wavelength is preferably executed in the cermet layer. Reducing the cermet layer thickness reduces the absorbitivity in the range of the visible spectrum as well. This can be partially compensated for, without influencing the threshold wavelength, by increasing the thickness of the antireflection layer. It is therefore useful to increase the thickness of the antireflection layer when reducing the cermet thickness.

In order to simplify the manufacturing process, it is also possible to execute a variation of the layer thickness through an uneven rotation of the tube during individual coating processes or during all of them.

According to another embodiment for setting varying threshold wavelengths, the absorber layer can have different compositions in the different regions.

The different composition is preferably achieved by means of metallic filler material that is present in different percentages in the individual regions. This metallic filler material can preferably be present in the cermet layer. Preferred metallic filler materials include chromium, aluminum, copper, and/or molybdenum. The concentrations of filler material in the cermet layer in individual regions lie between 20% and 60%.

The concentrator has a high reflectivity in the entire wavelength range between the visible and the infrared range. By means of the thickness and/or composition of the cermet layer and/or the antireflection layer, it is possible to influence the percentage of absorbed radiation in the visible and near infrared ranges.

According to another variant of the invention, the solar absorber has an absorber tube and a casing encompassing the absorber tube; in combination with a concentrator, the solar absorber has a side oriented toward the concentrator and a side oriented away from the concentrator. According to the present invention, at least one region of the casing on the side oriented away from the concentrator is provided with a coating that reflects the thermal radiation. In the wavelength range of solar radiation, this coating can be partially transparent (low-e coating) or reflective (metallic mirror).

This coating can extend over at most half the circumference of the casing. In this instance, the coating is preferably applied to the inside of the casing.

Preferably, the coating is provided in two lateral edge regions between which there is no coating. This makes it possible to make use of the portion of incident direct solar radiation that strikes the section between the edge regions. The portion that comes directly from the sun and strikes the absorber directly, i.e. without being deflected by the concentrator, makes up approximately 1% of the total capturable radiation in conventional parabolic trough collectors.

The lateral edge regions are the regions that are not struck by either direct incident radiation from the sun or reflected radiation from the concentrator. It is therefore clearly advisable to provide a corresponding coating in these edge regions in order to reduce thermal losses there.

A complete covering by means of a transparent or metallic coating of the entire region of the casing oriented away from concentrator can be useful if the operating temperature of the solar absorber is high. At lower operating temperatures, the coating in the edge regions is preferable.

The term "partial transparency" is understood to mean a transmission of preferably 30% to 70%; the transmission relates to the wavelength range of solar radiation in the range from 300 nm to 2500 nm. In the infrared range (wavelength range>2500 nm), the preferably metallic coating is highly reflective, which is understood to be a reflectivity of>70%.

The coating is preferably composed of a material with a high reflectivity. Preferably, aluminum or silver is used as the material for this coating.

According to another variant of the invention, an element composed of a material that is reflective in the IR range is situated between the casing and the absorber tube on the side oriented away from the concentrator.

This element can be a metallic foil, a woven material, or a metal sheet.

The placement of one or more such elements can be selected in accordance with the coating of the casing. The element can extend over half the tube circumference of the absorber tube. It is also possible, however, for two elements to be provided, which are situated in the lateral edge regions in a fashion similar to the embodiment in which the casing is coated in the edge regions.

The element or elements can have raised edges, which achieves an additional concentrating effect. The raised edges preferably have an angle of <45° in relation to the axis of the concentrator.

The element or elements are preferably comprised of aluminum or stainless steel. The element can also be coated with silver in order to increase the reflection in the infrared wavelength range.

Since the element is situated in the intermediate space between the absorber tube and the casing, it is necessary to take into account the fact that attaching it to one of the two tubes exposes it to stresses due to the different coefficients of linear expansion of the different materials. It is therefore preferable to use a malleable material or for the element or elements to be situated in a mobile, in particular sliding, fashion.

BRIEF DESCRIPTION OF THE DRAWING

Exemplary embodiments of the invention will be explained below in conjunction with the drawings.

DETAILED DESCRIPTION OF THE INVENTION

Figure 1:
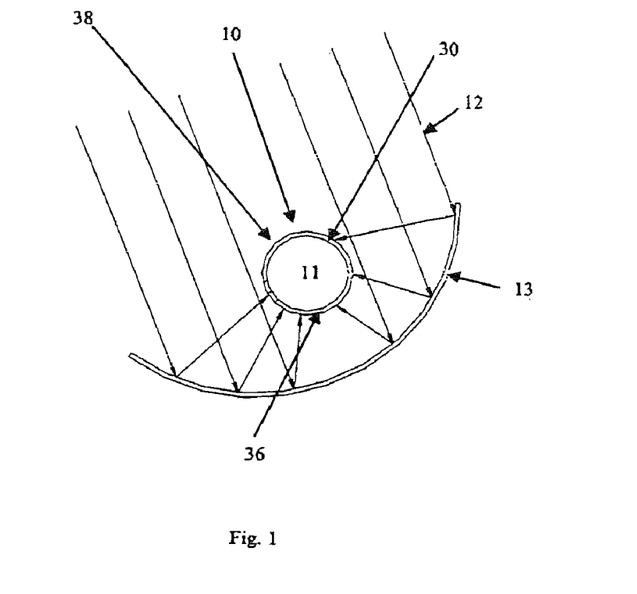
FIG. 1 is a schematic depiction of a solar absorber with an absorber body and a concentrator.

FIG. 1 shows the absorber body 10, which in this instance is an elongated absorber tube 30 through the interior 11 of which a heat transfer medium flows. A concentrator 13 in the form of a parabolic mirror concentrates and focuses the incident solar radiation 12 onto the absorber body 10. The absorber body 10 absorbs the solar radiation and converts it into heat, which is transmitted to the heat transfer medium. This heats the heat transfer medium.

Figure 2:
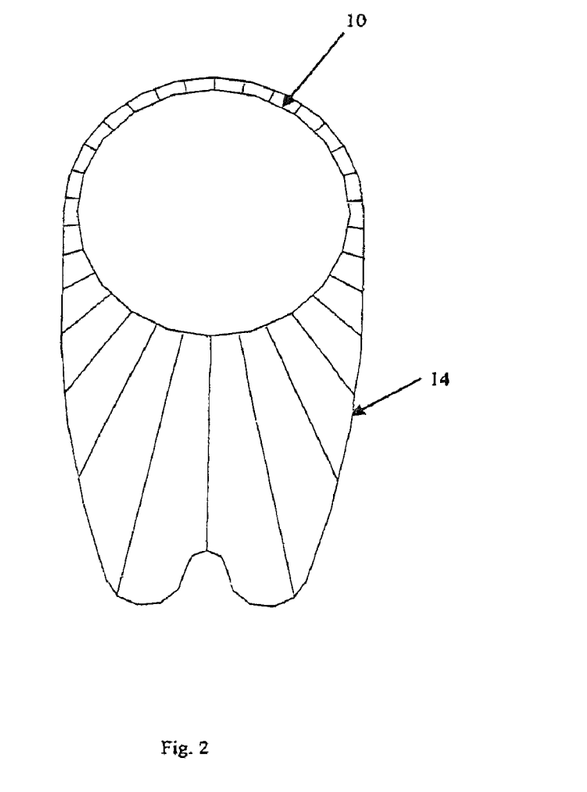
FIG. 2 is a circular diagram of the radiant energy density striking the absorber body.

FIG. 2 shows the distribution of radiant energy density 14 over the circumference of the absorber body in polar coordinates. On the side 36 oriented toward the concentrator 13, the radiant energy density is high. On the side 38 oriented away from the concentrator, the radiant energy density is equal to the radiant energy density of the incident solar radiation, which could be expressed as the value "1".

Figure 3:
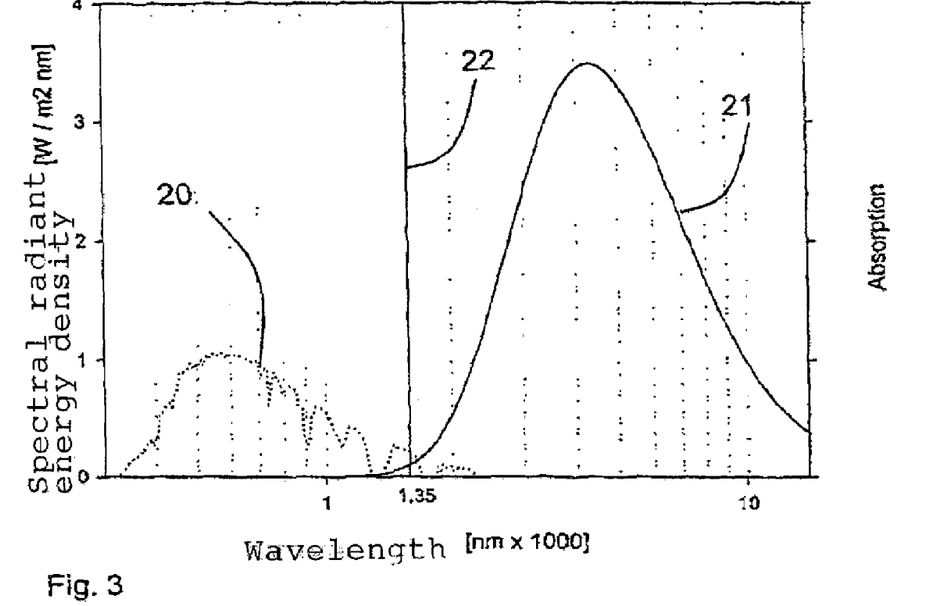
FIG. 3 is a graph of the spectral radiant energy density and absorbitivity as a function of the wavelength in unconcentrated incident radiation.

FIG. 3 shows the spectral distribution of the radiant energy density of the incident solar radiation by means of the curve labeled 20. The numeral 21 indicates a curve demonstrating the spectral radiant energy density of a black body at a temperature of 500° C. The two curves 20 and 21 each have one maximum and fall off on both sides of it. The two curves are separate from each other, but intersect in a base region.

The numeral 22 indicates the ideal threshold wavelength that passes through the intersecting point of the solar spectrum 20 and the black body spectrum 21. Below this wavelength, the ideal optically selective absorber absorbs the solar radiation completely while only emitting slight radiation losses. These radiation losses are comprised of the area below the curve 21 and below the threshold wavelength of 1350 nm. Above the threshold wavelength 22, the absorbitivity—and therefore also the emissivity—equals zero. This means that the absorption body 10 does not radiate any heat and only loses a slight amount of incident solar radiation through reflection. This radiation loss is proportional to the area under the curve 20 for wavelengths λ>1350 nm.

Figure 4:
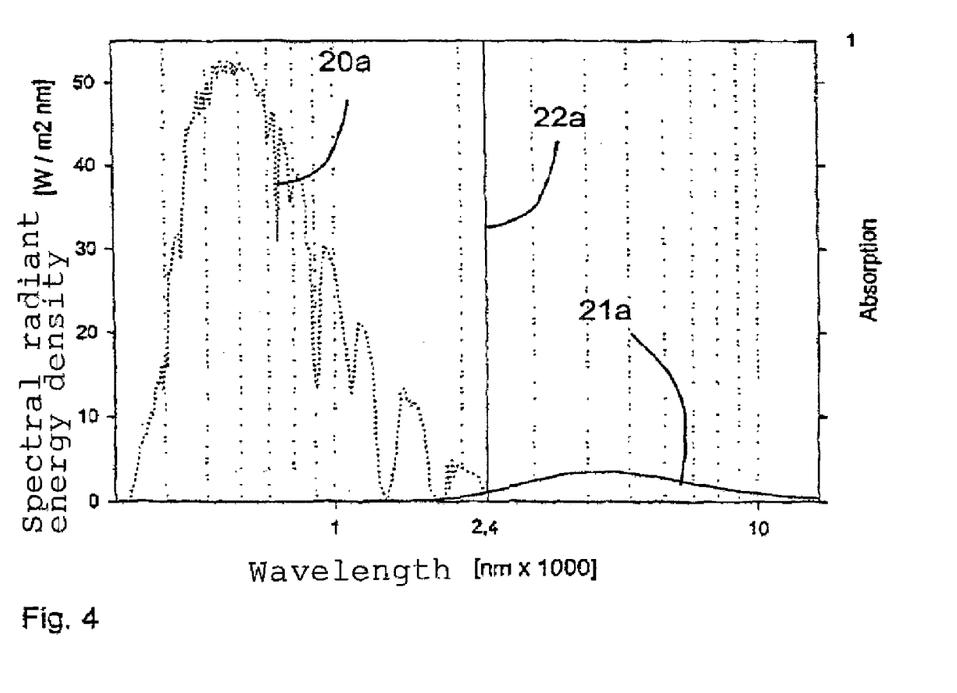
FIG. 4 is a graph of the spectral radiant energy density and absorbitivity in concentrated incident radiation.

FIG. 4 shows the solar spectrum 20a concentrated by a factor of 50 and the curve 21a that indicates the spectrum of a hot black body at 500° C. The scale of FIG. 4 has been altered in relation to that of FIG. 3. The curve 22a shows the progression of the absorbitivity of an ideal optically selective coating. It passes through the intersecting point of the two curves 20a and 21a, situated at the increased radiant energy density at a wavelength λ=2400 nm.

It is therefore clear from FIGS. 3 and 4 that at higher radiant energy densities, the curve 22 is shifted toward higher wavelengths.

Figure 5:
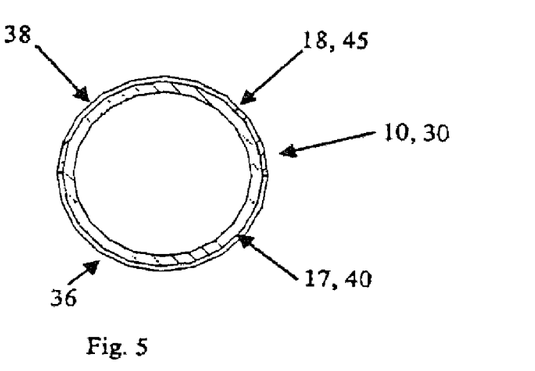
FIG. 5 shows a cross-section through a first exemplary embodiment for the absorber body.

The invention makes use of this circumstance in that the absorber body 10, which is embodied in the form of an absorber tube 30, has different absorber layers 17, 18 according to FIG. 5. The absorber layer 17 in the region 40 is situated on the side oriented toward the concentrator 13 and the absorber layer 18 in the region 45 is situated on the side 38 oriented away from the concentrator.

The absorber layers 17 and 18 are thin layers in the nanometer range. They are composed of materials of the kind described in WO 97/26488, for example. In particular, these are Ti—N—O-based interference absorber layers that achieve different color effects depending on the layer thickness. Basically, the absorption layers 17, 18 can be comprised of the same base material and the individual regions can differ in terms of their layer thicknesses. Due to the interference effect, the different regions have different threshold wavelengths 22. The thickness of the absorption layer should be less than 10 μm and in particular less than 1000 nm, and most preferably less than 100 nm. The absorber layer is homogeneously applied.

An exemplary embodiment of a solar absorber according to the present invention is shown in Table 1 below. In this table, λ represents the wavelength, TWL represents the threshold wavelength, and ∈ represents the emissivity of the absorption layer.

TABLE 1

| ideal selective layer (α = 1 for λ < TWL, ∈ = 0 for λ > TWL) | concentration | threshold wavelength nm | radiation balance (absorbed radiation power up to TWL, minus emitted radiation output) kW · m$^{-2}$ | yield in % of incident radiation % |
|---|---|---|---|---|
| top | 1 | 1350 | +0.65 | 85.8 |
| bottom | 50 | 2400 | +36.78 | 97.2 |
| total | | | 37.43 | 97.25 |

It is clear that the solar absorber as a whole has a high absorption capacity over all ranges of different radiant energy density and delivers a high yield of incident radiation.

The absorber layers 17 and 18 in FIG. 5 can also both have the same layer structure. The layers are preferably manufactured by means of a thin film technology in which several layers in succession are applied to a substrate. In particular, a mirror layer 25, a cermet layer 26, and a dielectric antireflection layer 27 can be deposited one after another onto a steel tube 31 (see FIG. 6). The mirror layer 25 reflects electromagnetic radiation in the infrared and visible wavelength ranges. The thickness and/or composition of the cermet layer 26 and antireflection layer 27 influences the percentage of absorbed radiation. The cermet layer 26 contains a filler material that typically makes up 20% to 60% of the cermet layer 26. In particular, chromium, aluminum, copper, or molybdenum can be used as the filler material.

Figure 6:
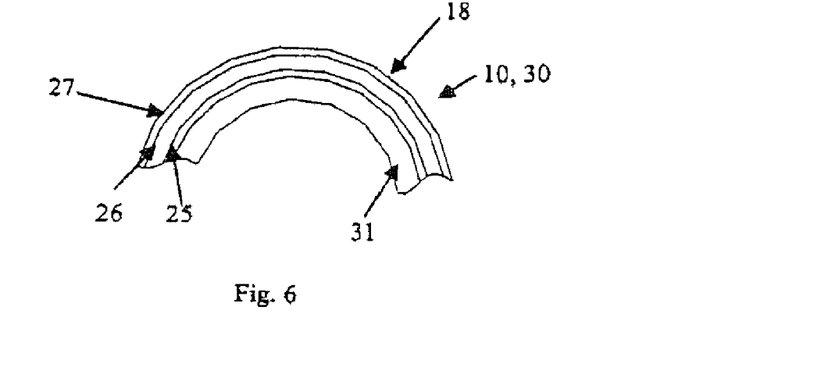
FIG. 6 shows a partial cross section through the absorber tube shown in FIG. 5, and FIGS. 7-11 show cross-sectional depictions of various embodiments of solar absorbers equipped with an absorber tube and casing.

The optical properties of the absorber layer are varied by varying the layer thickness and/or composition in the regions 17 and 18. On the side oriented away from the concentrator, the absorber layer 18 is embodied as 5 to 20% thinner, for example, than the absorber layer 17 oriented toward the concentrator. Preferably, the thickness is not changed. As a result, the change in the absorber layer is achieved solely by varying the cermet and antireflection coatings. The absorber layer 18 oriented away from the concentrator 13 includes at most half of the tube circumference. The decrease in layer thickness can, for example, be achieved by varying the rotation speed of the tube during the coating process.

Figure 7:
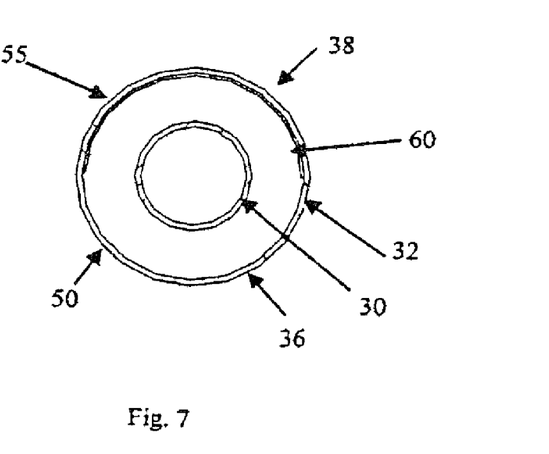

FIG. 7 shows another embodiment, which has an absorber tube 30 and a casing 32 and in which a coating 60 is applied to the inside of the casing 32. The preferably metallic coating 60 is situated in the region 55 of the casing oriented away from the concentrator, which is not shown. In the region 50 of the casing 32, which is oriented toward the concentrator, no coating is provided in the casing 32.

Figure 8:
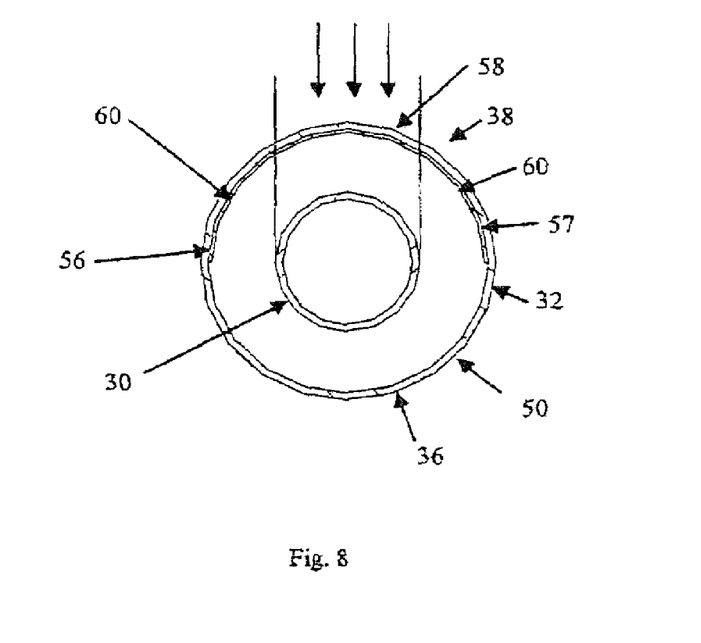

FIG. 8 shows a modified embodiment that differs from the embodiment shown in FIG. 7 in that the coating 60 is only applied in an edge region 56, 57 that is not struck either by the direct incident solar radiation indicated with arrows or by the radiation reflected from the concentrator.

In the intermediate region 58, an opaque or partially transparent coating is provided so that in this region 58, the incident solar radiation is allowed to pass through and can strike the absorber tube 30.

The partial transparency of the metallic coating in the region 58 lies in the wavelength range of solar radiation from 3000 nm to 2500 nm. The percentage of transmitted radiation out of the overall incident radiation in the spectrum of sunlight preferably lies between approximately 30% and 70%. In the far infrared range (>2500 nm), the coating is highly reflective, i.e. the percentage of reflected radiation is more than 70%.

Figure 9:
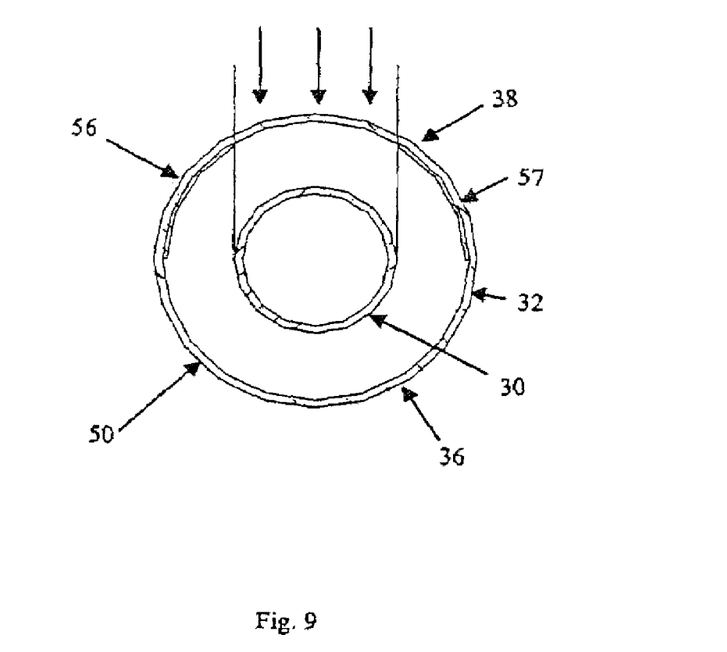

In FIG. 9, this region 58 is provided with no coating at all.

If the side 38 oriented away from the reflector is opaque or impenetrable to solar radiation, then a region 20 of the casing can be embodied as uncoated. The uncoated region constitutes a window, so to speak, for the incident solar radiation striking the casing 32 from the outside on the side 38 oriented away from the reflector. This assures that the solar radiation can be used for heat gain.

Figure 10:
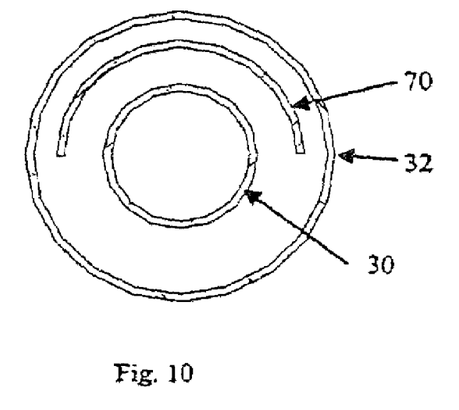

FIG. 10 shows another embodiment in which an element 70, which is comprised of a material that is reflective in the infrared range, is situated between the absorber tube 30 and the casing 32. This element 70 extends over half the circumference and is situated in the region oriented away from the concentrator.

The element 70 is comprised of a metallic foil that is preferably made of aluminum or stainless steel. To increase the reflectivity in the IR wavelength range, it is also possible for silver-coated materials to be used for the foil. The metallic foil is thermally coupled to the absorber tube or the casing. This prevents the metallic foil from heating locally and therefore changing its shape or position in the annular gap due to thermal expansion. During operation, the absorber tube 30 is heated so that it expands. The metal foil itself is malleable and mobile, thus allowing length differences between the absorber tube 30 and the metal foil to be compensated for.

Figure 11:
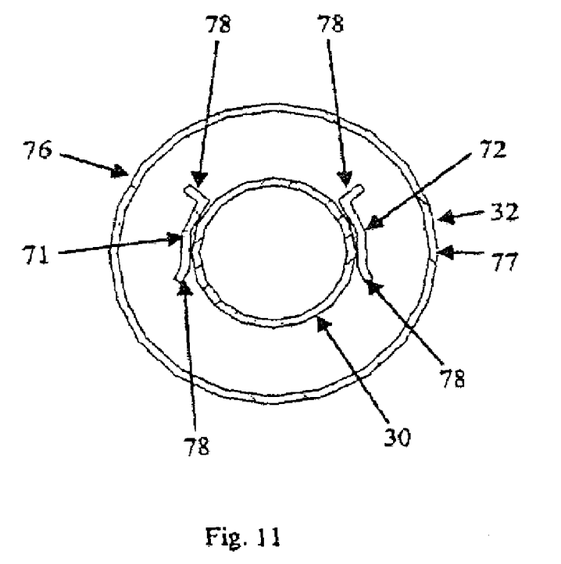

FIG. 11 shows another embodiment equipped with two elements 71, 72, which are situated between the absorber tube 30 and the casing 32 in the edge regions 76 and 77 that are not struck by either radiation reflected from the concentrator or the direct solar radiation.

In order to increase the radiation yield, raised edges 78 are provided at the margins, which form a 45° angle with the concentrator axis (not shown).

| Reference Numeral List | |
|---|---|
| 10 | absorber body |
| 11 | interior |
| 12 | solar radiation |
| 13 | concentrator |
| 14 | radiant energy density |
| 17 | absorber layer |
| 18 | absorber layer |
| 20 | curve, solar spectrum |
| 21 | curve, black body spectrum |
| 21a | curve |
| 22 | threshold wavelength |
| 22a | curve |
| 25 | mirror layer |
| 26 | cermet layer |
| 27 | antireflection layer |
| 30 | absorber tube |
| 31 | steel tube |
| 32 | casing |
| 36 | side oriented toward the concentrator |
| 38 | side oriented away from the concentrator |
| 40 | absorber tube region |
| 45 | absorber tube region |
| 50 | casing region |
| 55 | casing region |
| 56 | edge region |
| 57 | edge region |
| 58 | intermediate region |
| 60 | metallic coating |
| 70 | element |
| 71 | element |
| 72 | element |
| 76 | edge region |
| 77 | edge region |
| 78 | edge |

What is claimed is:

1. A solar absorber equipped with an absorber body (10),
wherein said absorber body (10) has a side oriented toward a concentrator (13) that concentrates and focuses incident solar energy (12) on the absorber body (10) and an opposite side (38) oriented away from the concentrator (13);
wherein a selective absorption layer (17) is provided on said side (36) of the absorber body oriented toward the concentrator (13) and another selective absorption layer (18) is provided on said opposite side (38) of the absorber body oriented away from the concentrator (13);
wherein said selective absorption layer (17) on said side (36) oriented toward the concentrator (13) has a threshold wavelength below which solar radiation is absorbed and above which a reradiation capacity of the absorber body is suppressed by the selective absorption layer (17);
wherein said another selective absorption layer (18) on said opposite side (38) facing away from the concentrator (13) has another threshold wavelength below which said solar radiation is absorbed and above which said reradiation capacity of the absorber body is suppressed by said another selective absorption layer (18); and
wherein said threshold wavelength of said selective absorption layer (17) is greater than said another threshold wavelength of said another selective absorption layer (18).

2. The solar absorber as recited in claim 1, wherein the absorber body (10) is an absorber tube (30).

3. The solar absorber as recited in claim 2, wherein the absorber tube is a steel tube.

4. The solar absorber as recited in claim 1, wherein the absorber body (10) is a porous ceramic body.

5. The solar absorber as recited in claim 1, wherein said selective absorption layer (17) and said another selective absorption layer (18) each have a respective thickness that is less than 10 µm.

6. The solar absorber as recited in claim 5, wherein said respective thickness is less than 200 nm.

7. The solar absorber as recited in claim 1, wherein said absorber body (10) is divided into respective regions (40, 45) with correspondingly different wavelength thresholds for absorption of the incident solar energy.

8. The solar absorber as recited in claim 1, wherein said selective absorption layer (17) has a thickness that is different from that of said another selective absorption layer (18).

9. The solar absorber as recited in claim 8, wherein said another selective absorption layer (18) on said opposite side (38) of the absorber body oriented away from the concentrator (13) is 5 to 20 percent thinner than said selective absorption layer (17) on said side (36) oriented toward the concentrator (13).

10. The solar absorber as recited in claim 1, wherein said selective absorption layer (17) on said side (36) oriented toward the concentrator (13) has a composition that is different from that of said another selective absorption layer (18) on said opposite side (38) of the absorber body oriented away from the concentrator (13).

11. The solar absorber as recited in claim 1, wherein said selective absorption layer (17) and said another selective absorption layer (18) each have at least one cermet layer (26) containing at least one metallic filler, but different amounts of said at least one metallic filler are present in said at least one cermet layer of said selective absorption layer (17) and said at least one cermet layer of said another selective absorption layer (18).

12. The solar absorber as recited in claim 11, wherein said at least one metallic filler comprises chromium, aluminum, copper and/or molybdenum.

13. The solar absorber as recited in claim 11, wherein said at least one cermet layer contains from 20 to 60 percent of said at least one metallic filler.

* * * * *